US010452304B2

(12) United States Patent
Tomayko et al.

(10) Patent No.: US 10,452,304 B2
(45) Date of Patent: Oct. 22, 2019

(54) EFFICIENT REPOSITORY MIGRATION AND STORAGE

(71) Applicant: GitHub, Inc., San Francisco, CA (US)

(72) Inventors: Ryan Tomayko, San Francisco, CA (US); Jeffrey King, Charlottesville, VA (US); Jesse Toth, San Francisco, CA (US)

(73) Assignee: GITHUB, INC., San Francisco, CA (US)

( * ) Notice: Subject to any disclaimer, the term of this patent is extended or adjusted under 35 U.S.C. 154(b) by 0 days.

(21) Appl. No.: 16/178,878

(22) Filed: Nov. 2, 2018

(65) Prior Publication Data

US 2019/0073153 A1 Mar. 7, 2019

Related U.S. Application Data

(63) Continuation of application No. 15/133,117, filed on Apr. 19, 2016, now Pat. No. 10,152,265.

(60) Provisional application No. 62/153,911, filed on Apr. 28, 2015.

(51) Int. Cl.
*G06F 3/06* (2006.01)
*H04L 29/08* (2006.01)
*G06F 16/11* (2019.01)
*H04L 29/12* (2006.01)
*G06F 8/71* (2018.01)
*G06F 16/27* (2019.01)

(52) U.S. Cl.
CPC ............ *G06F 3/0647* (2013.01); *G06F 3/065* (2013.01); *G06F 3/067* (2013.01); *G06F 3/0613* (2013.01); *G06F 8/71* (2013.01); *G06F 16/119* (2019.01); *H04L 61/15* (2013.01); *H04L 67/1095* (2013.01); *G06F 16/27* (2019.01)

(58) Field of Classification Search
CPC .............. H04L 61/15; G06F 17/30575; G06F 15/30893
See application file for complete search history.

(56) References Cited

U.S. PATENT DOCUMENTS

| 5,752,247 | A | * | 5/1998 | Henderson | H04L 41/0213 |
| 6,016,499 | A | * | 1/2000 | Ferguson | G06F 16/252 |
| 7,483,965 | B1 | * | 1/2009 | Gerraty | H04L 41/0806 |
| | | | | | 707/999.008 |
| 7,792,800 | B1 | * | 9/2010 | Carson, Jr. | H04L 41/082 |
| | | | | | 707/640 |
| 8,583,769 | B1 | * | 11/2013 | Peters | G06F 9/541 |
| | | | | | 709/221 |
| 9,396,197 | B2 | * | 7/2016 | Hwang | G06F 16/44 |
| 9,430,229 | B1 | * | 8/2016 | Van Zijst | G06F 9/3844 |
| 9,524,325 | B2 | * | 12/2016 | Stam | H04L 67/10 |
| 9,817,724 | B2 | * | 11/2017 | Dain | G06F 11/1448 |
| 2007/0094257 | A1 | * | 4/2007 | Lankford | G06F 16/113 |
| 2008/0140672 | A1 | * | 6/2008 | Tomida | G06F 16/119 |
| 2008/0243954 | A1 | * | 10/2008 | Augenstein | G06F 11/1451 |

(Continued)

*Primary Examiner* — Lashonda T Jacobs
(74) *Attorney, Agent, or Firm* — Workman Nydegger

(57) ABSTRACT

A system for efficient repository migration and storage includes an interface and a processor to migrate a repository from a standard repository system in which a standard repository data is replicated in multiple repositories to an efficient repository system in which related repositories are grouped together as a network of repositories and an efficient repository data is stored in a shared network repository.

20 Claims, 11 Drawing Sheets

(56) References Cited

U.S. PATENT DOCUMENTS

| | | | |
|---|---|---|---|
| 2008/0301559 A1* | 12/2008 | Martinsen | G06F 9/451 |
| | | | 715/710 |
| 2009/0216954 A1* | 8/2009 | Benhase | G06F 12/0804 |
| | | | 711/133 |
| 2009/0271455 A1* | 10/2009 | Nagarajan | G06F 11/203 |
| 2012/0059805 A1* | 3/2012 | Bhogal | G06F 8/63 |
| | | | 707/694 |
| 2014/0215436 A1* | 7/2014 | DeLuca | G06F 8/70 |
| | | | 717/121 |
| 2014/0244716 A1* | 8/2014 | Stam | H04L 67/10 |
| | | | 709/203 |
| 2015/0286427 A1* | 10/2015 | Akirav | G06F 3/0619 |
| | | | 711/103 |
| 2016/0217150 A1* | 7/2016 | Davis | G06F 16/1794 |
| 2017/0132087 A1* | 5/2017 | Dowlatkhah | G06F 16/27 |

* cited by examiner

EFFICIENT REPOSITORY MIGRATION AND STORAGE

CROSS REFERENCE TO OTHER APPLICATIONS

This application is a continuation of U.S. patent application Ser. No. 15/133,117, entitled EFFICIENT REPOSITORY MIGRATION AND STORAGE, filed Apr. 19, 2016, which issued as U.S. Pat. No. 10,152,265 on Dec. 11, 2018 and which claims priority to U.S. Provisional Patent Application Ser. No. 62/153,911, entitled EFFICIENT REPOSITORY MIGRATION AND STORAGE filed Apr. 28, 2015, both of which are incorporated herein by reference for all purposes.

BACKGROUND OF THE INVENTION

For multiple users to work on a large code base, each user typically requires a copy of the code base. One problem of making a copy of the code base for each user is that storing multiple copies of the code base requires tremendous amounts of storage. Another problem is that even in the event that a solution is found to reduce the storage requirements, it is difficult to perform structural changes to the system that stores the large code base.

BRIEF DESCRIPTION OF THE DRAWINGS

Various embodiments of the invention are disclosed in the following detailed description and the accompanying drawings.

DETAILED DESCRIPTION

Figure 1:
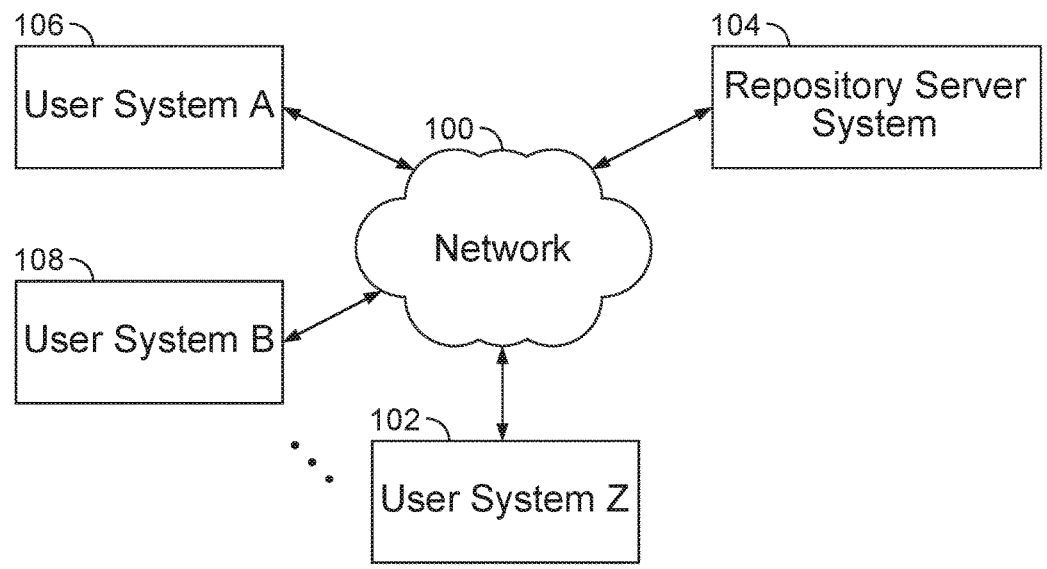
FIG. 1 is a block diagram illustrating an embodiment of a system for efficient repository migration and storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for efficient repository migration and storage is disclosed. The system comprises an interface to receive an indication to migrate a repository from a standard repository system in which a standard repository data is replicated in multiple repositories to an efficient repository system in which related repositories are grouped together as a network of repositories and an efficient repository data is stored in a shared network repository. The system comprises a processor to determine a destination repository for the repository to be migrated, hardlink copy the repository to be migrated into the destination repository, determine whether the repository belongs to a network of repositories, and determine whether a shared network repository needs to be created. In the event that the shared network repository needs to be created, the processor creates the shared network repository. In the event that the repository belongs to a network of repositories, the processor enables the destination repository to utilize the shared repository created for the network.

In some embodiments, a standard repository system stores multiple repositories. In some embodiments, the multiple repositories comprises a repository that is a fork of another repository. For example, the fork repository is a copy of a source repository that is subsequently modified. In some embodiments of a standard repository system, the entire source repository is replicated in the fork repository, causing duplicative elements to be stored in the repository system. In some embodiments, a company desires to migrate from a standard repository system to an efficient repository system to free up computer memory. In some embodiments, the migration of a repository comprises determining a destination repository and hardlink copying the repository to its destination repository such that the location of the original repository is stored in the destination repository. The processor determines whether the repository belongs to a network of repositories. In some embodiments, a network of repositories comprises repositories that are related to each other via forks. The processor determines whether a shared network repository needs to be created, and creates the shared network repository in the event that it needs to be created. In some embodiments, a shared network repository is created only once for a given network. In the event that the repository belongs to a network of repositories, the repository enables the destination repository to utilize the shared repository created for the network. In some embodiments, the processor is further to rename the directories of the repository to be migrated and the destination repository. In some embodiments, a sync is performed to remove duplicated data from repositories of the network and store the data in the shared network repository.

FIG. 1 is a diagram illustrating an embodiment of a system for repository storage. FIG. 1 is an embodiment of a standard or efficient system for repository storage. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system A 106, user system B 108, and user system Z 102 communicate with repository server system 104 via network 100. In various embodiments, the system comprises 2, 14, 100, or any appropriate number of user systems. In various embodiments, a user writes, modifies, tests, maintains, or performs any other appropriate action on a repository residing in the user's user system. In some embodiments, the user stores a copy of the repository in repository server system 104. In various embodiments, repository server system 104 comprises public or private repositories. In some embodiments, the repository is stored in repository server system 104 in order to facilitate collaboration of users, for example, to allow another user to branch off of the user's repository. In some embodiments, repository server system 104 comprises a server for storing a code base and for storing working copies of the code base for each of the users of the user systems.

Figure 2:
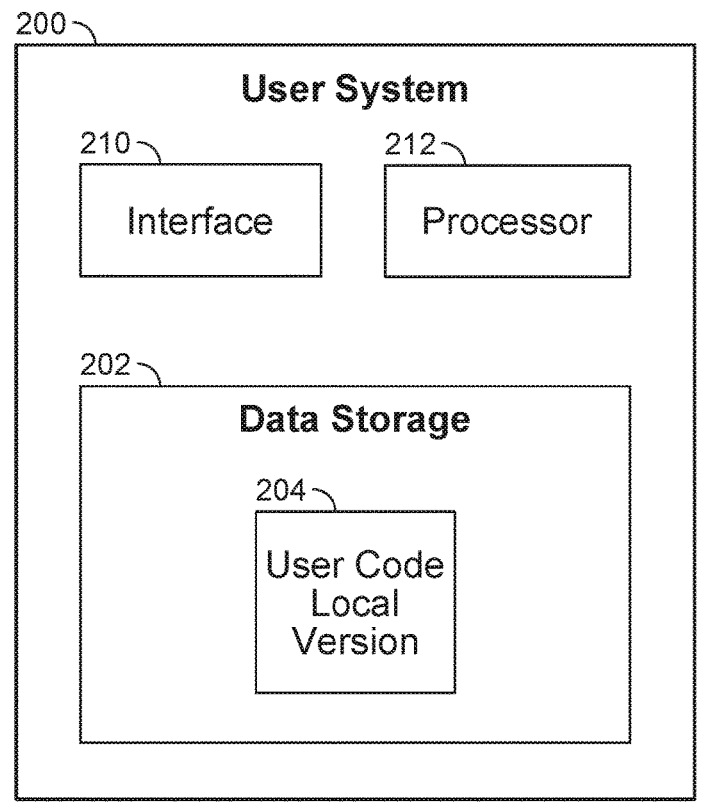
FIG. 2 is a block diagram illustrating an embodiment of a user system.

FIG. 2 is a diagram illustrating an embodiment of a user system of a system for efficient repository storage. In various embodiments, user system 200 is used to implement user system A 100, user system B 106, or user system Z 102 of FIG. 1. In the example shown, user system 200 comprises processor 212, interface 210, and data storage 202. Data storage 202 comprises user code local version 204. Processor 212 is coupled to interface 210 and receives or provides instructions via interface 210. Processor 212 is coupled to memory (e.g., read only memory, random access memory, integrated circuit memory, magnetic memory, or any other data storage or combination of data storage) that stores data and/or instructions that are provided to processor 212. In some embodiments, memory comprises data storage 202. In some embodiments, user code local version 204 comprises a repository. In some embodiments, user code local version 204 comprises a copy of a repository that is additionally stored in a repository server system. In some embodiments, a user accesses, modifies, works with, and utilizes user code local version 204 of user system 200.

Figure 3:
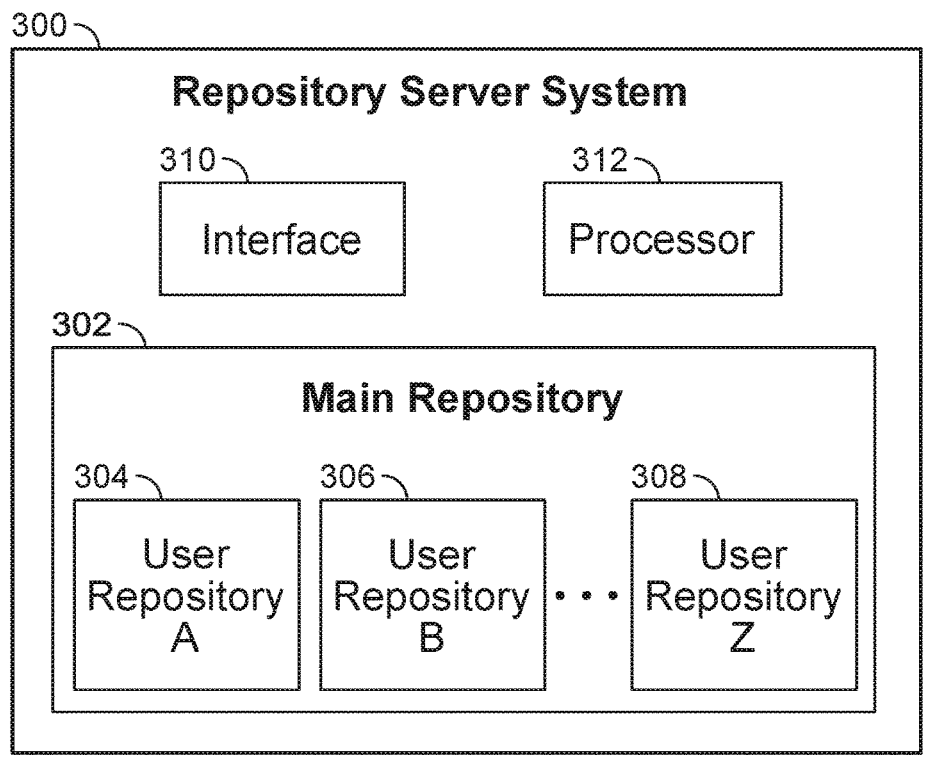
FIG. 3 is a block diagram illustrating an embodiment of a repository server system.

FIG. 3 is a diagram illustrating an embodiment of a repository server system for efficient repository storage. In some embodiments, repository server system 300 is used to implement repository server system 104 of FIG. 1. In the example shown, repository server system 300 comprises main repository 302, processor 312, and interface 310. Main repository 302 comprises multiple user code repository versions (e.g., user repository A 304, user repository B 306, and user repository Z 308). In some embodiments, the main repository stores multiple repositories that comprise a repository that is a fork of another repository. In some embodiments, the main repository stores repositories that are unrelated. In some embodiments, a user repository stored in the main repository is a duplicate of a user repository stored on a user system. Processor 312 is coupled to interface 310 and receives or provides instructions via interface 312. Processor 312 is coupled to memory (e.g., read only memory, random access memory, integrated circuit memory, magnetic memory, or any other data storage or combination of data storage) that stores data and/or instructions that are provided to processor 312. In some embodiments, memory comprises main repository 302.

Figure 4:
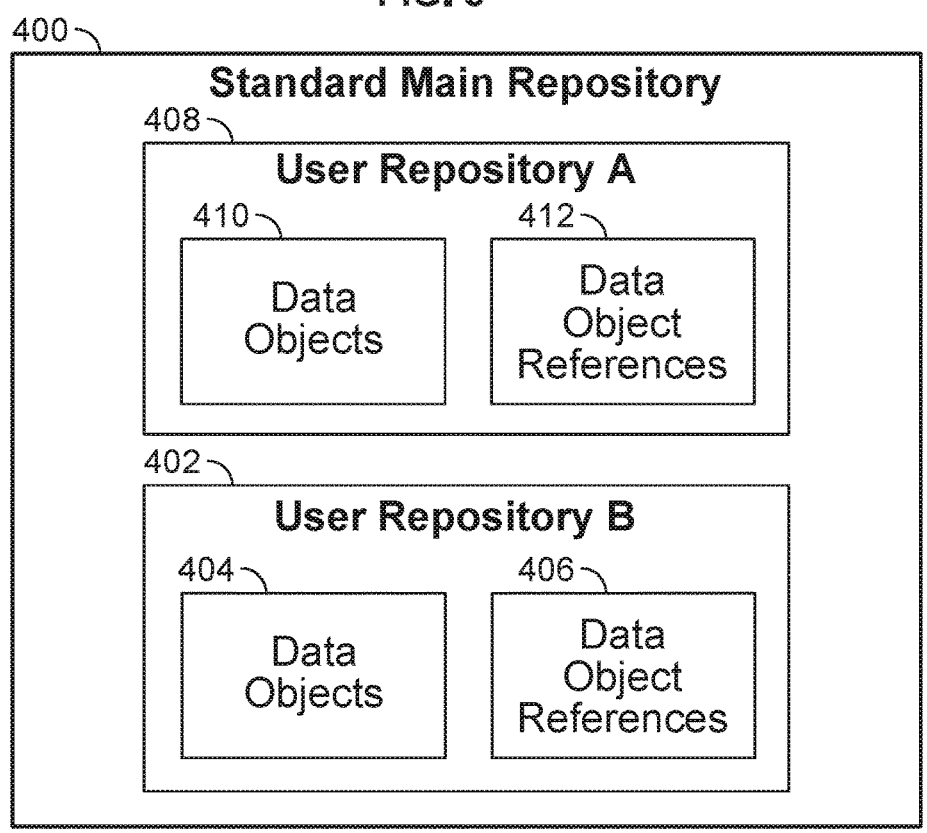
FIG. 4 is a block diagram illustrating an embodiment of a standard main repository.

FIG. 4 is a block diagram illustrating an embodiment of a standard main repository. In some embodiments, standard main repository 400 is used to implement main repository 302 of FIG. 3. In the example shown, standard main repository 400 comprises user repository A 408 and user repository B 402. In some embodiments, standard main repository 400 is a main repository in a repository server system of a standard repository storage system. User repository A 408 comprises data objects 410 and data object references 412. In some embodiments, a data object reference points to a data object. User repository B 402 comprises data objects 404 and data object references 406. In some embodiments, a data object of data objects 410 is also present in data objects 404. In some embodiments, a user repository stores code for a user and data objects are used to store one or more portions of code.

Figure 5:
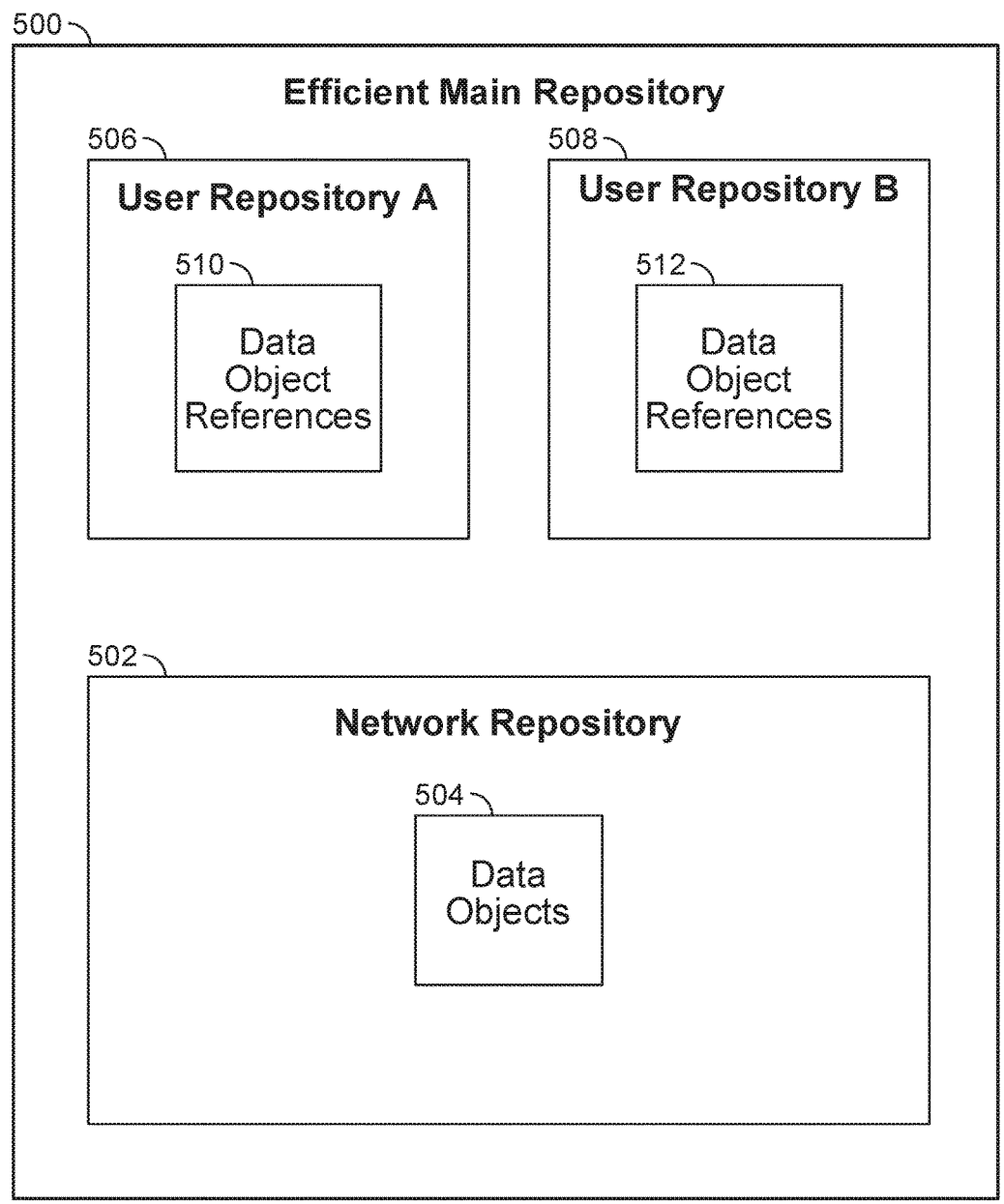
FIG. 5 is a block diagram illustrating an embodiment of an efficient main repository.

FIG. 5 is a block diagram illustrating an embodiment of an efficient main repository. In some embodiments, efficient main repository 500 is used to implement main repository 302 of FIG. 3. In the example shown, efficient main repository 500 comprises user repository A 506, user repository B 508, and network repository 502. In some embodiments, efficient main repository 500 is a main repository in a repository server system of an efficient repository storage system. User repository A 506 comprises data object references 510. User repository B 508 comprises data object references 512. In some embodiments, user repository A 506 and user repository B 508 are related repositories grouped together as a network of repositories. Network repository 502 comprises data objects 504. In some embodiments, network repository 502 is a shared network repository that stores data objects. In some embodiments, data objects 504 are referenced by repositories in the network of repositories that utilize the shared network repository (e.g. user repository A 506 and user repository B 508). In some embodiments, efficient main repository 500 uses less computer memory than a standard main repository because data objects 504 is not stored duplicitously.

Figure 6:
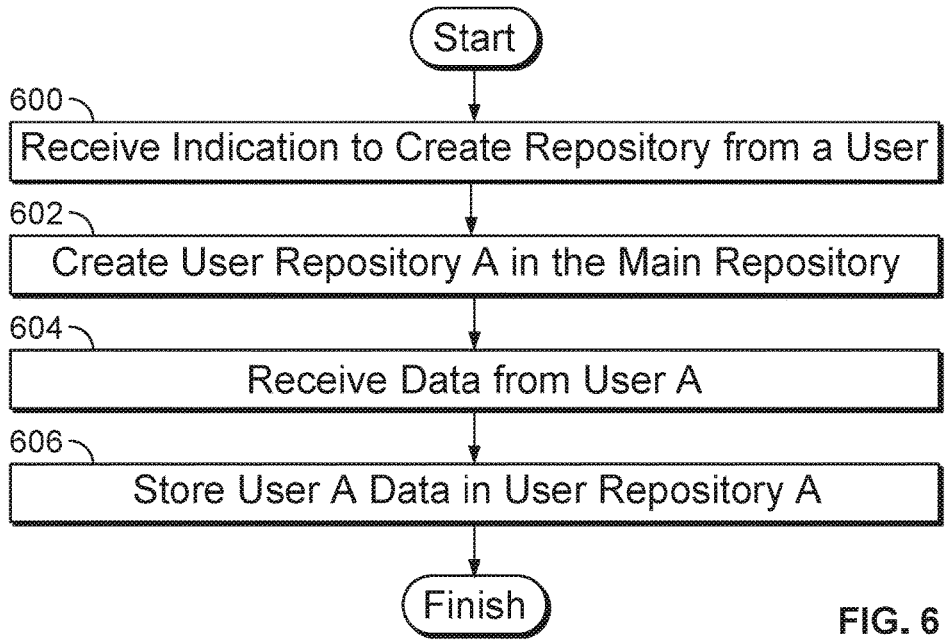
FIG. 6 is a flow diagram illustrating an embodiment of a standard repository initialization flow.

FIG. 6 is a flow diagram illustrating an embodiment of a standard repository initialization flow. In some embodiments, the process of FIG. 6 is used to initialize repositories in a standard repository (e.g., standard main repository 400 of FIG. 4). In the example shown, in 600, an indication to create a repository is received from a user. In 602, user repository A is created in the main repository. In various embodiments, the user repository path is based on a username of the user or a name of the main repository. For example, the repository server system creates alice/repo.git on a main repository of a repository server system for a user Alice. In 604, data is received from user A. For example, Alice pushes the data to alice/repo.git. In 606, user A data is stored in user repository A.

Figure 7:
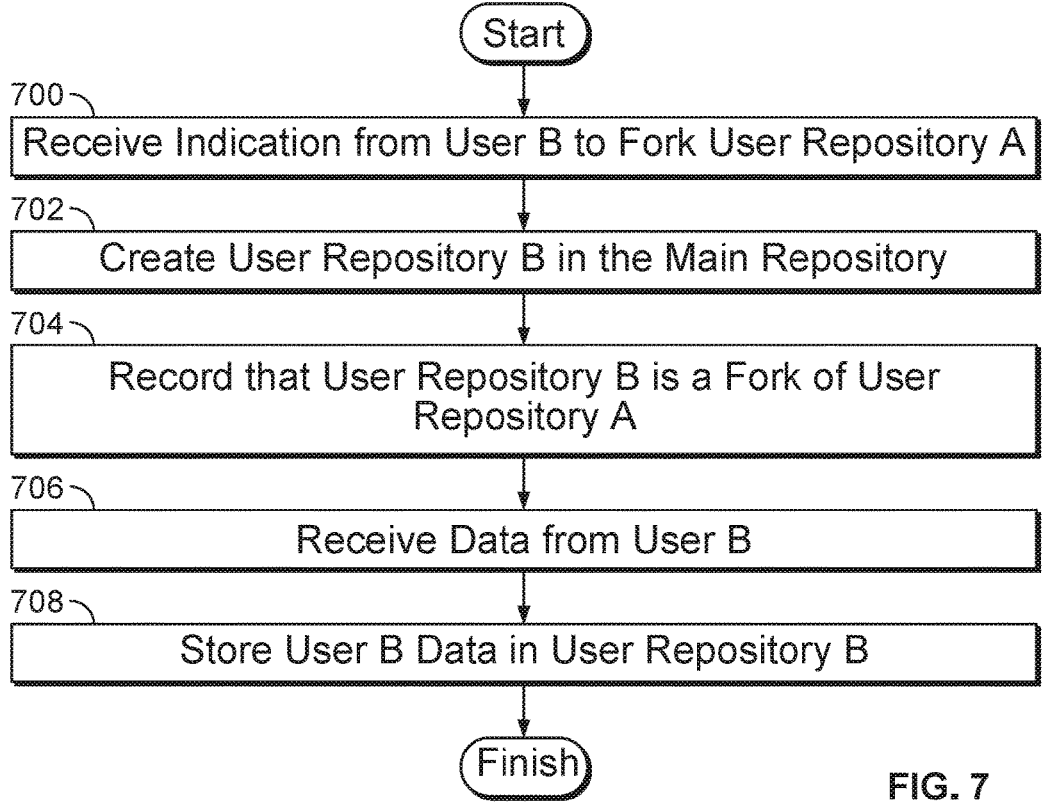
FIG. 7 is a flow diagram illustrating an embodiment of a standard repository fork flow.

FIG. 7 is a flow diagram illustrating an embodiment of a standard repository fork flow. In some embodiments, the process of FIG. 7 is used to fork a repository in a standard repository (e.g., standard main repository 400 of FIG. 4). In the example shown, in 700, an indication is received from user B to fork user repository A. In 702, user repository B is created in the main repository. For example, a user Bob forks alice/repo.git. In various embodiments, the user repository path is based on a username of the user or a name of the main repository. For example, a copy of alice/repo.git is made under the name bob/repo.git. In 704, it is recorded that user repository B is a fork of user repository A. In 706, data is received from user B. In 708, user B data is stored in user repository B. In some embodiments, the data received from user B changes one or more data object references in user repository B. In some embodiments, object references are small (e.g., occupy less computer memory) and unique to different user repositories. In some embodiments, data objects are replicated between user repository A and user repository B that are large and occupy a lot of disk space or computer memory.

Figure 8:
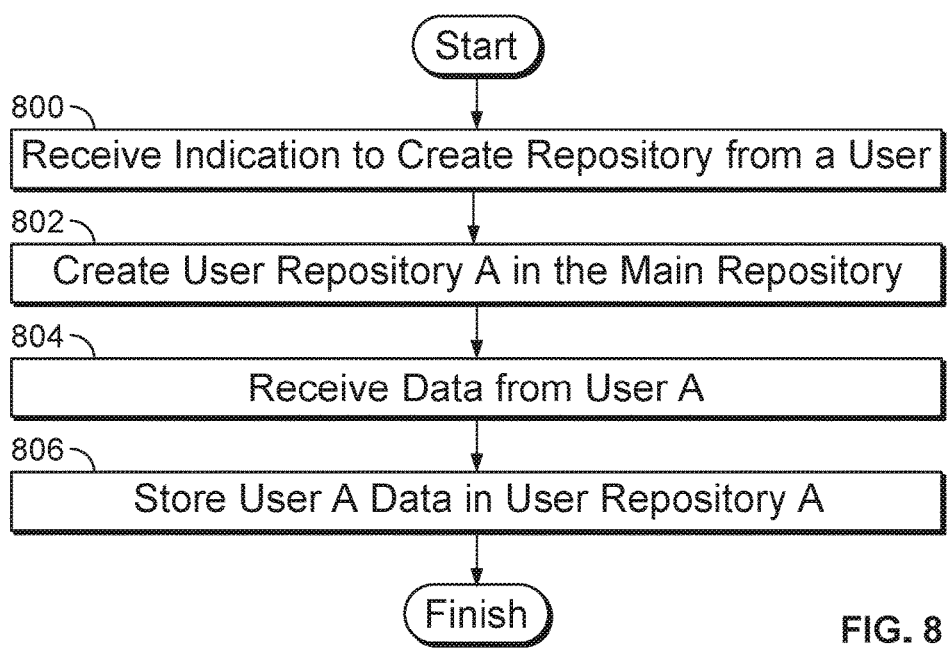
FIG. 8 is a flow diagram illustrating an embodiment of an efficient repository initialization flow.

FIG. 8 is a flow diagram illustrating an embodiment of an efficient repository initialization flow. In some embodiments, the process of FIG. 8 is used to initialize an efficient repository (e.g., efficient repository 500 of FIG. 5). In the example shown, in 800, an indication to create a repository is received from a user. In some embodiments, the indication comprises a request to create a new repository (e.g. a repository that is not a fork of another repository). In 802, user repository A is created in the main repository. In some embodiments, a numerical repository ID is defined for each user repository in order to keep track of the user repository in the repository server system. In some embodiments, using numeric IDs instead of user or repository names simplifies the logic needed to execute a user or repository rename. In some embodiments, the numeric ID is assigned based on a repositories table in a database. For example, a repository ID of 42 is assigned to user repository A. In some embodiments, a user repository is named based on the repository ID and stored in a path based on the repository ID. For example, a repository 42.git is created for user Alice in the path/repositories/42. In some embodiments, the repository ID of a repository is the same as a network ID of the repository. For example, 42 is the repository ID and the network ID of repository A. In 804, data is received from user A. In 806, user A data is stored in user repository A. In some embodiments, user A data comprises data pushed by a user.

Figure 9:
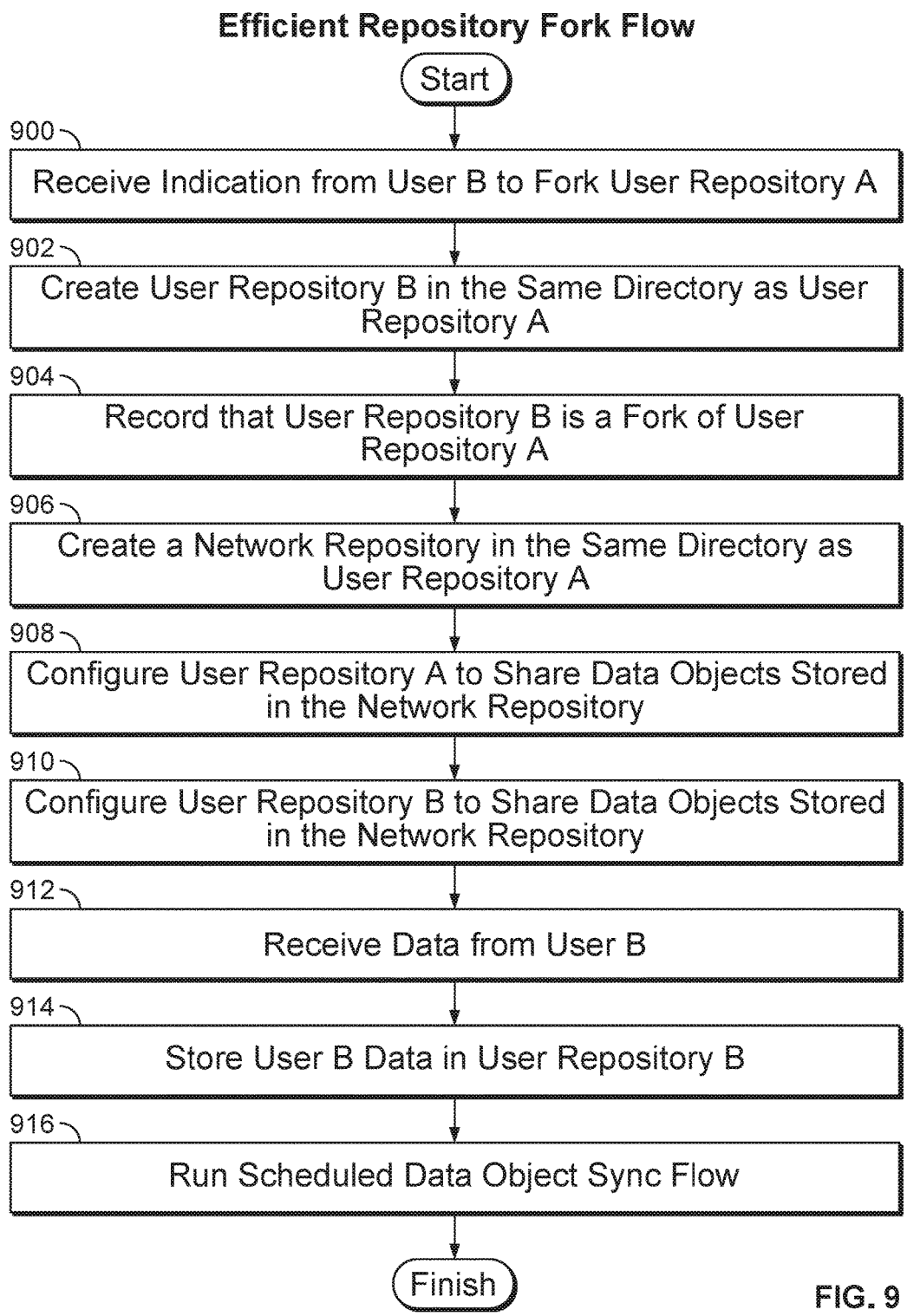
FIG. 9 is a flow diagram illustrating an embodiment of an efficient repository fork flow.

FIG. 9 is a flow diagram illustrating an embodiment of an efficient repository fork flow. In some embodiments, the process of FIG. 9 is used to fork an efficient repository (e.g., efficient repository 500 of FIG. 5). In the example shown, in 900, an indication is received from user B to fork user repository A. In 902, user repository B is created in the same directory as user repository A. In 904, it is recorded that user repository B is a fork of user repository A. In some embodiments, user repository B receives a copy of user repository A's data object references as an initial state. In 906, a network repository is created in the same directory as user repository A. In some embodiments, repositories of a same network are stored within a same directory. In some embodiments, user repository B is named based on its repository ID. For example, a user Bob's fork of a user Alice's repository results in the addition of 43.git under the path/repositories/ 42. In some embodiments, a shared network repository is created upon processing a first fork repository of the network of repositories. In some embodiments, the shared network repository is created in the same directory as the source repository (e.g. user repository A). For example, user Bob's fork of user Alice's repository is the first fork, and a shared network repository named network.git is created in/repositories/42. In 908, user repository A is configured to share data objects stored in the network repository. In some embodiments, configuring a user repository comprises applying a "git alternatives" configuration to the user repository that instructs git to search the shared network directory for data objects that are not found in the user repository. In 910, user repository B is configured to share data objects stored in the network repository. In 912, data is received from user B. In 914, user B data is stored in user repository B. For example, data pushed by Bob is stored in 43.git. In 916, a data object sync flow is run.

Figure 10:
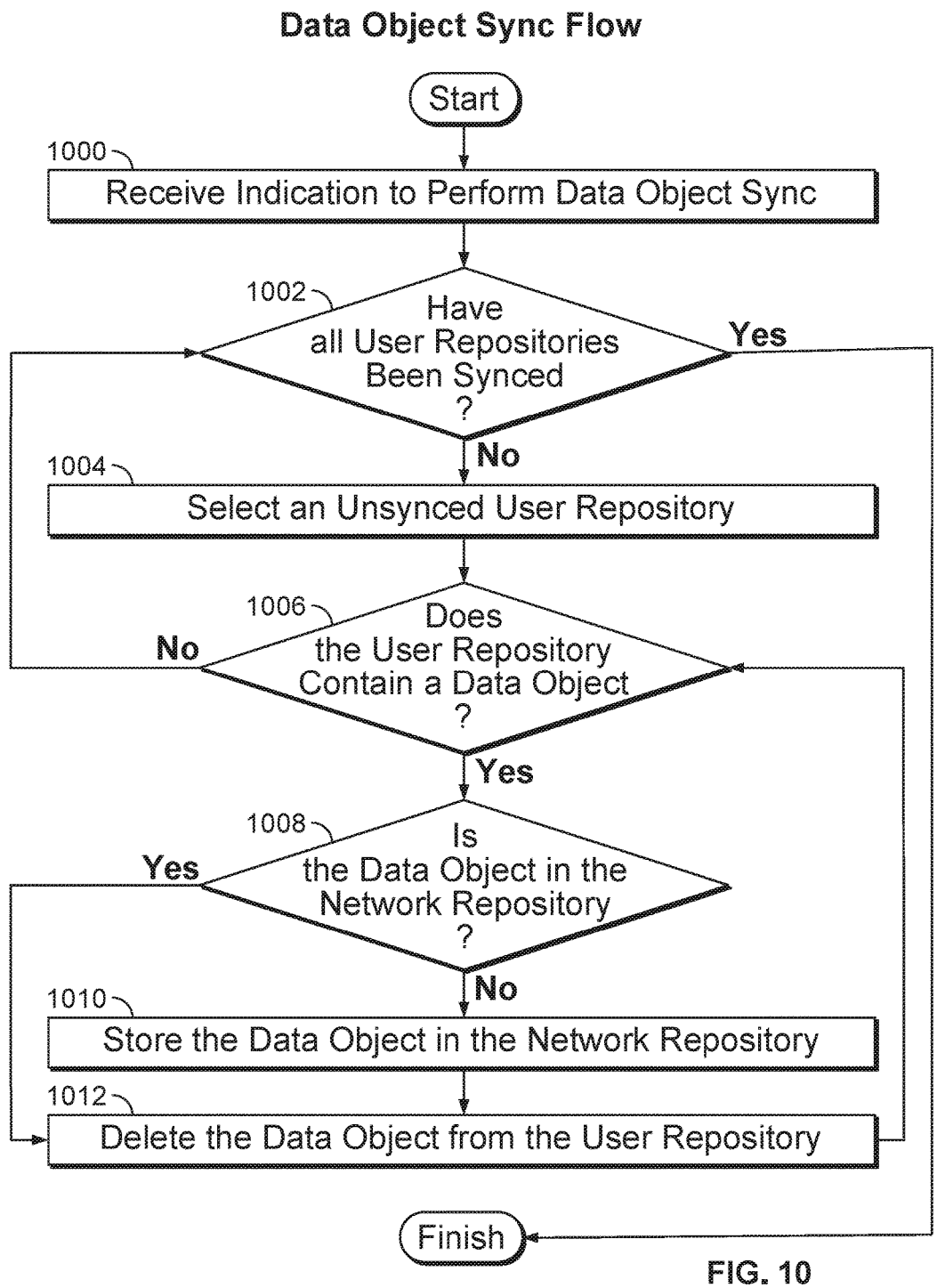
FIG. 10 is a flow diagram illustrating an embodiment of a data object sync flow.

FIG. 10 is a flow diagram illustrating an embodiment of a data object sync flow. In some embodiments, the process of FIG. 10 is used to sync data objects as the data objects transition to an efficient data repository (e.g., efficient data repository 500 of FIG. 5). In the example shown, in 1000, an indication to perform a data object sync is received. In some embodiments, a sync is performed to move data objects stored in repositories of the network of repositories to the shared network repository created for the network. In 1002, a check is performed to determine whether all user repositories have been synced. In some embodiments, all data object reside in the shared network directory in the event all user repositories are synced. In the event that not all user repositories have been synced, in 1004, an unsynced user repository is selected. In 1006, a check is performed to determine whether the user repository contains a data object. In the event that the user repository does not contain a data object, control passes to 1002. In the event that the user does contain a data object, in 1008, it is determined whether the data object is in the network repository. In the event that the data object is not in the network repository, in 1010, the data object is stored in the network repository. In 1012, the data object is deleted from the user repository, and control passes to 1006 to check for more data objects. In the event that the data object is in the network repository, control passes to 1012. In the event that the user repository does not contain a data object, in 1002 a check is performed for unsynced user repositories. In the event that all user repositories have been synced, the flow is finished. In some embodiments, data objects are initially stored in a respective user repository in a system for efficient repository storage, and the data object sync moves data objects to the shared network directory and deletes them from the user repositories. In some embodiments, the object sync flow moves accumulated data object data from individual repositories into the shared network.git repository. In some embodiments, the data object sync is performed as part of a scheduled maintenance procedure.

In some embodiments, automated maintenance happens periodically. In some embodiments, a garbage collection happens in order to remove data objects that are no longer referenced in user repositories from the shared network repository and to "re-pack" (e.g., group together/organize/ optimize) the data objects. In some embodiments, the shared network repository is repacked to optimize storage efficiency. In some embodiments, data object references in all of the network's repositories need to be considered in computing data object reachability. In some embodiments, the scheduled maintenance procedure is responsible for selecting repositories most eligible for maintenance and performing storage maintenance tasks on them. In some embodiments, an on-disk size of the migrated repository or the shared network repository is recorded. In various embodiments, data object storage maintenance on the network of repositories is scheduled based on one or more of the following: a number of changes since last maintenance, an on-disk size of changes since last maintenance, a time since last maintenance, or any other information. In some embodiments, repository networks are ranked in eligibility for maintenance and the most eligible is scheduled first.

In some embodiments, the system comprises commands that are used to manage repository networks. In various embodiments, the commands comprise synchronizing changes from user repositories into the network repository, linking/unlinking repositories with the network repository, performing a full network repository garbage collection, or any other appropriate commands. In some embodiments, a user or administrator runs a garbage collection utility (e.g., the command git nw-gc) from the network repository or issue the command/gc <user>/<repo> from Campfire to garbage collect a network. In some embodiments, completed network garbage collection results in data objects shared by more than one repository having a single point of storage in the network repository.

Figure 11:
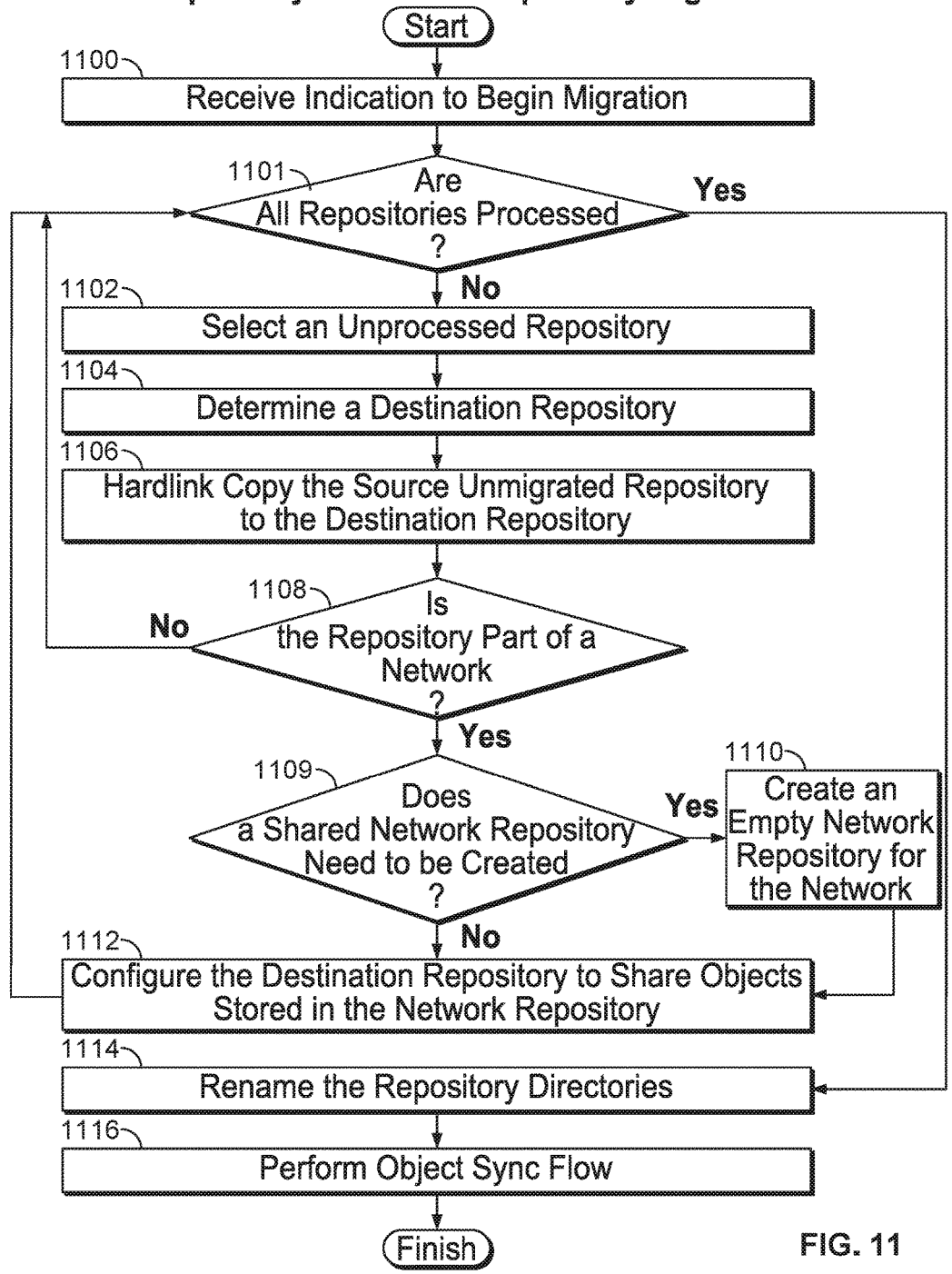
FIG. 11 is a flow diagram illustrating an embodiment of a standard repository to efficient repository migration flow.

FIG. 11 is a flow diagram illustrating an embodiment of a standard repository to efficient repository migration flow. In some embodiments, the process of FIG. 11 is used to migrate objects in a standard repository form to an efficient repository form (e.g., from standard repository 400 of FIG. 4 to efficient repository 500 of FIG. 5). In the example shown, in 1100, an indication to begin migration is received. In some embodiments, the indication comprises an indication to convert all repositories from an old on-disk format to a new on-disk format. In some embodiments, an efficient repository storage system comprises a net-shard layout. In some embodiments, all repositories are transitioned to a net-shared layout during the migration. In some embodiments, during migration, a parallel file system hierarchy is created with repositories in their net-shard location. For example, a parallel hierarchy is created at the directory/data/user/repositories-new for a directory/data/user/repositories intended to be migrated. In some embodiments, /data/user/repositories is the root of the net-shard file system layout for the duration of the transition. In some embodiments, an administrator runs a system upgrade to begin an upgrade process. In some embodiments, the repositories are taken offline for a portion of the migration. In 1101, it is determined whether all repositories are processed. In the event that not all repositories are processed, in 1102, an unprocessed repository is selected.

In 1104, a destination repository is determined. In some embodiments, a path for the destination repository is generated using a hash of a network content. In some embodiments, the network content comprises a network ID. In some embodiments, the network ID and repository ID of the repository to be migrated is looked up in a database. In some embodiments, the destination repository is created and git-init'd in the net-sharded location. In some embodiments, all repositories with the same database source_id are stored on the same file server, partition, and directory shard. In some embodiments, the base shard path is determined by taking the MD5 message-digest algorithm of the numeric source_id. For example:
source_id=42
md5(42)=a1d0c6e83f027327d8461063f4ac58a6
shard path=/data/repositories/a/nw/a1/d0/c6/42
In some embodiments, the shard path comprises a root repository (e.g. 42.git), a shared network directory (e.g. network.git), and multiple repositories that are forks of the root repository (e.g. 57.git, 100.git).

In 1006, the source unmigrated repository is hardlink copied to the destination repository. In some embodiments, the contents are hardlink copied into the destination repository net-shard location. In some embodiments, hardlinking repository contents in into the new layout is performed during a downtime portion of the upgrade process. In some embodiments, hardlink copying comprises creating a filesystem entry under the destination repository pointing to the file data of the source repository. In some embodiments, hardlink copying allows the source repository to remain available for rollback. In some embodiments, the processor reinstates the standard repository system in event of an error during migration. In various embodiments, all data objects, packed data references, loose data references, reflops, auxiliary files, and/or any other appropriate items are hardlinked. In some embodiments, hardlinking is accomplished on a single repository network by running a cp –al command on the source repository directory.

In 1108, it is determined whether the repository is part of a network. In some embodiments, a network of repositories comprises a source repository and a repository that is a fork of the source repository. In some embodiments, repositories in the same network of repositories share a network id. In some embodiments, a repository is determined to be part of a network based on a network ID. In some embodiments, a repository is determined not to be part of a network in the event that it is not a fork of a repository and also has no forks. In the event that the repository is not part of a network, control passes to step 1101. In the event that the repository is part of a network, in 1109 it is determined whether a shared network repository needs to be created. For example, it is determined whether the repository is the first fork in the network. In the event that the repository is the first fork in the network, in 1110 an empty network repository is created for the network. In some embodiments, all required repositories exist at this point in the process and data has not yet been synced to the appropriate repositories. In some embodiments, the determination of whether the repository is part of a network is performed before hardlinking occurs. In some embodiments, hardlinking is accomplished on a single repository network by running a cp –al command on the source repository directory. In some embodiments, packs and data objects of a source repository that is part of a network are hardlinked under an objects directory in the shared network directory (e.g., network.git/objects). In various embodiments, packed data references, loose data reference, reflogs, auxiliary files of a source repository that is part of a network, or any other appropriate items are hardlinked under the destination repository.

In some embodiments, every repository network has a single shared network repository. In some embodiments, the network repository is not owned by any user. In some embodiments, the network repository is a normal repository in every way but is not publicly accessible via remote protocols. In some embodiments, the network repository stores all data object files as well as all data object references for user repositories in the network. In some embodiments, the network repository is located under the same shard path as all other repositories in a network, under the special repository name "network.git."

In 1112, the destination repository is configured to share objects stored in the network repository, and control passes to 1101. For example, the destination repository is enabled to utilize the shared repository created for the network. In some embodiments, configuring the repository comprises enabling git alternates. In some embodiments, an objects/info/alternates file is created in the destination repository and the shared network repository is added to the file. In some embodiments, the destination repository gains access to data stored in the shared network repository. In some embodiments, the network repository is set up to share data objects. In some embodiments, an object/info/alternates file in a user repository is set to ../../../network.git/objects. In some embodiments, a user repository is setup with an alternate to the network repository by running the command echo ../../../network.git/objects>42.git/objects/info/alternates. In some embodiments, enabling git alternates results in commit, tree, blob, submodule, or any other appropriate data objects in the shared network repository to be reachable when accessing the user repository. In some embodiments, the source repository data is copied over into the destination repository. In the event that the repository is not the first fork in the network, control passes to 1112.

In some embodiments, the processor is further to rename the directories of the repository to be migrated and the destination repository. In the event that it is determined in 1101 that all repositories are processed, the repository directories are renamed in 1114. For example, the source repository directory is named/data/user/repositories and the destination repository directory is named/data/user/repositories-new during migration; after migration, the source repository directory is renamed/data/user/repositories-old and the destination repository directory is renamed/data/user/repositories. In some embodiments, the renaming activates the new filesystem hierarchy and filesystem layout. In some embodiments, a rm -rf command is performed on the source repository layout or the source repository layout is removed. In some embodiments, the repositories in the net-shard layout are fully operational and the instance can be brought online. In 1116, an object sync flow is performed. In some embodiments, data objects are removed from the user repositories and consolidated in the respective network repository. In some embodiments, the migration process is not intensive on consuming valuable resources such as input-output (IO), central processing unit (CPU), and time because the data object sync is performed while repositories are online. In various embodiments, the repository network maintenance system visits each network, repacks to remove duplicate objects existing in multiple packs, makes a single tight packfile for the whole network, or any other appropriate action.

In some embodiments, in order to move repositories from an inefficient to an efficient layout (e.g., a net-shard layout), all existing repositories need to transition to the new layout during an upgrade. In some embodiments, the procedure to upgrade a system from pre-net-shard to post-net-shard shares the same process as a minor release upgrade. In various embodiments, the repository server system enacts maintenance mode, takes a file system snapshot of the system data volume, takes a backup-utils snapshot before performing the upgrade, or any other appropriate action. In some embodiments, the net-shared migration runs as a normal data transition and completes on large installations in a short period of time (e.g., 10 minutes or less). In some embodiments, the upgrade is run against a staging instance created from a recent backup or file system snapshot.

In some embodiments, the old file system layout remains in place unmodified in the event that the transition does not complete successful. In some embodiments, rolling back to the old file system layout comprises booting into the previous version of the virtual machine. In some embodiments, the system allows for the prevention of dual codepaths such that all code the migrated system comprises assumes the net-shared layout.

In some embodiments, repositories are organized by network. For example, the "rails/rails" repository and all forks are stored near each other on the same machine and on the same disk partition. In some embodiments, common objects are shared between each repository in the network. In some embodiments, common commits, trees, blobs, and tags are not duplicated between repositories and a single network-wide object store is used instead. In some embodiments, the network repository includes remotes for each user repository, created when each user repository is created. In some embodiments, remotes in the network repository are named after the numeric repository ID of the user repository. In some embodiments, in the event that a user repository is modified by a user push of data, the repository is fetched into the network repository by a background job (e.g., post-receive hook→repository-push→Repository.async_gc→GitHub::Jobs::RepositoryGc). In some embodiments, the network repository is used purely as an alternate mechanism and is not operated on directly.

In some embodiments, special repositories exist that are associated with a user repository and are stored alongside their user repository with a suffix immediately processing the .git file extension. In some embodiments, special repositories do not use alternates schedule. For example, 42.wiki.git is a special repository associated with a user repository 42.git.

Figure 12:
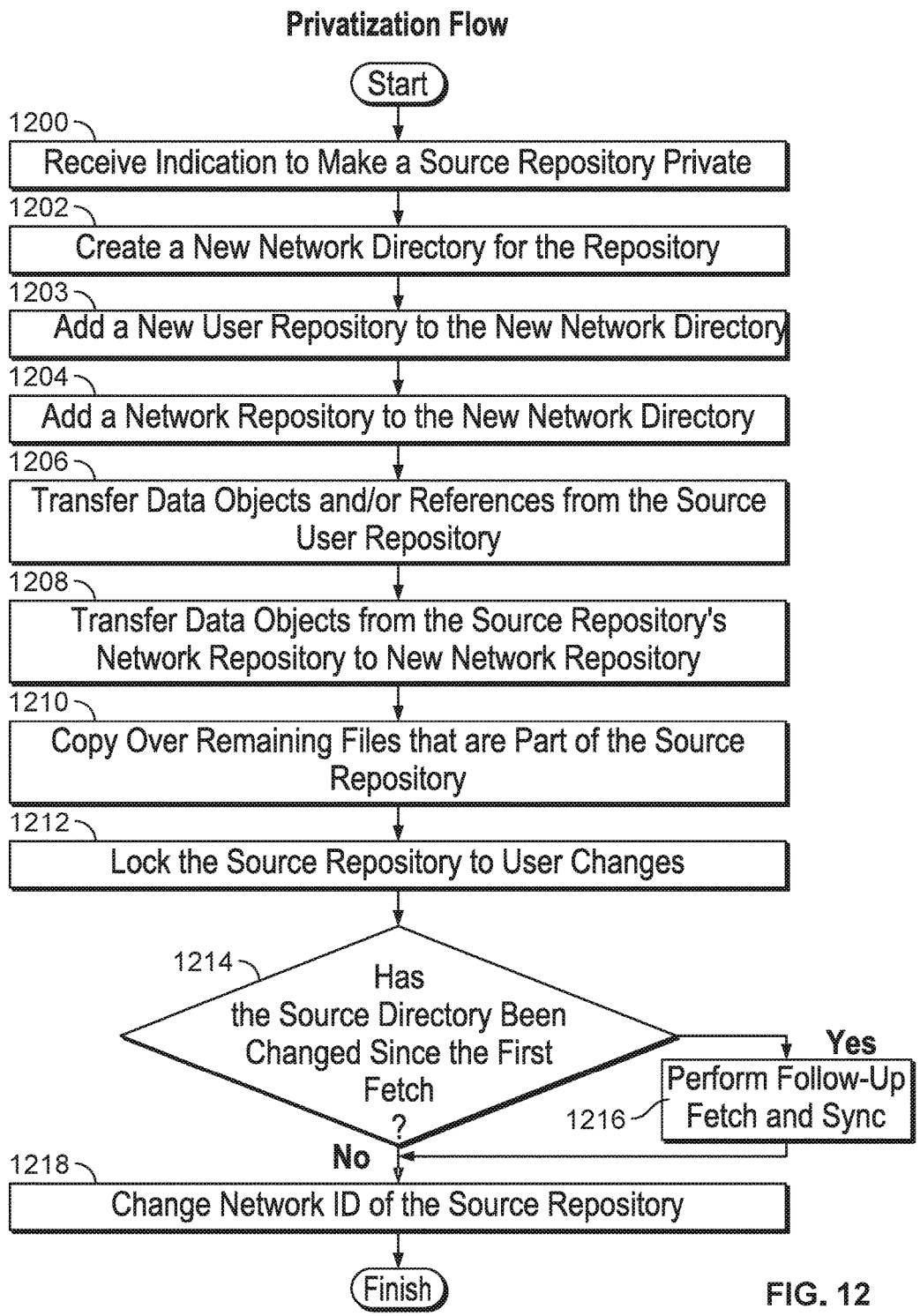
FIG. 12 is a flow diagram illustrating an embodiment of a privatization flow.

FIG. 12 is a flow diagram illustrating an embodiment of a privatization flow. In some embodiments, the process of FIG. 12 is used to take a repository and store it as a copy such that the data in the repository is not shared. In some embodiments, a system for repository privatization comprises an interface to receive an indication to move a repository that is part of a network out of the network. The system further comprises a processor to create a new network directory, add a new network repository to the new network directory, transfer data associated with the repository to the new network directory, and change the repository network ID of the repository to be moved.

In the example shown in FIG. 12, in 1200, an indication to make a source repository private is received. In some embodiments, detach operations are performed in the event that a repository in a network needs to be separated from its peers. For example, a repository needs to be made private for security reasons rather than being public in the network of repositories. In 1202, a new network directory is created for the repository. In 1203, a new user repository is added to the new network directory. In 1204, a network repository is added to the new network directory. In 1206, data objects and/or references are transferred from the source user repository. For example, data objects and/or references are transferred from source user repository to the new user repository. In some embodiments, the data is fetched via a git-fetch operation performed in the new user repository. In 1208, data objects are transferred from the source repository's network repository to the new network repository. For example, network repository objects (and/or references if appropriate) are moved from the source network repository to the new network repository. In some embodiments, a git-fetch operation is performed in the new network repository to copy over data objects that are related to the source repository from the source network repository. In 1210, remaining files that are part of the source repository are copied over. For example, files that are not data objects or data object references are copied over. In some embodiments, an rsync operation is performed. In 1212, the source repository is locked to user changes. In 1214, it is determined whether the source directory has been changed since the first fetch. In the event that the source directory has been changed since the first fetch, in 1216 a follow-up fetch and sync is performed, and control passes to 1218. In some embodiments, a git-fetch and rsync are performed. In 1218, the network ID of the source repository is changed. In some embodiments, the source repository is removed from the public network of repositories it previously belonged to and is now in a new network that only comprises data related to the source repository. In the event that the source directory has not been changed since the first fetch in 1214, control passes to step 1218. Upon completion of step 1218, the privatization flow is complete.

In some embodiments, an alternate scheme introduces privacy or security concerns around private repositories. For example, a user with access to a public repository A.git in a network that also includes a private repository B.git also has access to all B.git objects, creating a privacy concern. In some embodiments, an alternate scheme allows the flexibility to not share objects between private repositories in public/private networks. In some embodiments, private repositories in networks that include at least one public repository do not use alternates, and the repository is never fetched into network.git. In some embodiments, all objects are duplicated between private repositories when the network is mixed. In some embodiments, alternates are enabled for private repositories when the network is entirely private.

In some embodiments, routing information is managed for each network. In some embodiments, new repository networks are routed to the least loaded server. For example, the following are used for managing:
  Gh.storage.network.<source_id>—string file server hostname for the repository network with the corresponding<source_id>.
  Gh.storage.repo.<user>/<repo>—a two tuple of the form [<repo_id>, <source_id>], where both elements are integers. In some embodiments, the value must be kept in sync with the database and produce the same value as executing the following:
  Repo=Repository.nwo ("<user>/<repo>")
  [repo.id, repo.source_id]
These values are needed by proxies in order to establish the host route and on disk location of repositories.

In some embodiments, the following APIs are used to set and retrieve network server storage server routes:
  Chimney.get_network_route(network_id)
  Chimney.set_network_route(network_id)
  Chimney.set_network_route!(network_id, route)
  Chimney.delete_network_route(network_id)
  Chimney.shard_network_route(network_id)

In some embodiments, anything that routes to storage servers must use the APIs and request at least two operations to know the disk location of a repository. For example:
  Look up the <repo.id> given the <user>/<repo>.git path included in the command or GITRPC call.
  Look up the storage server hostname for the <source_id> retrieved
  Build the shard path: <fs>:/data/repositories/{md5(<source_id>)}[0]/nw/{md5(source_id>)[1,6]/<source_id>/<repo_id>.git In some embodiments, repositories have the following basic file system organization:
network-1/
  repo-1.git
  repo-2.git
  repo-3.git
  . . .
  network.git network-2/
  repo-1.git
  repo-2.git
  repo-3.git
  . . .
  network.git In some embodiments, the naming follows the following rules:
  All repositories under the same network are stored within the same containing directory (network-1 and network-2 above).
  Repository names must be unique within the network. The server uses the repository's unique database ID as the directory name.
  Each network has a single network.git repository where all shared objects are stored. This directory is created and managed entirely by utilities.
In some embodiments, in the event that a repository is linked to a network, all modifications are synchronized into the network.git repository using the utilities.

In some embodiments, all utilities commands are executed within the context of an individual repository. The shared network repository (e.g. network.git) is automatically created and managed as needed. In some embodiments, the utilities are as follows:
Enabling and disabling network.git sharing:
  git nw-link—Share a repository's objects with the network. Move all of the repository's objects to network.git and enable the git alternate.
  git nw-unlink—Stop sharing a repository's objects with the network. Pull all objects back into the repository from network.git and disable the git alternate.
  git nw-linked—Test if the repository is currently linked and optionally write the full path location of the network.git repository.
Synchronizing changes with network.git:
  Git nw-sync—Move all new objects into network.git. The repository should not have any local objects when this command completes. This command must be called any time a repository's ref space is modified.

Figure 13:
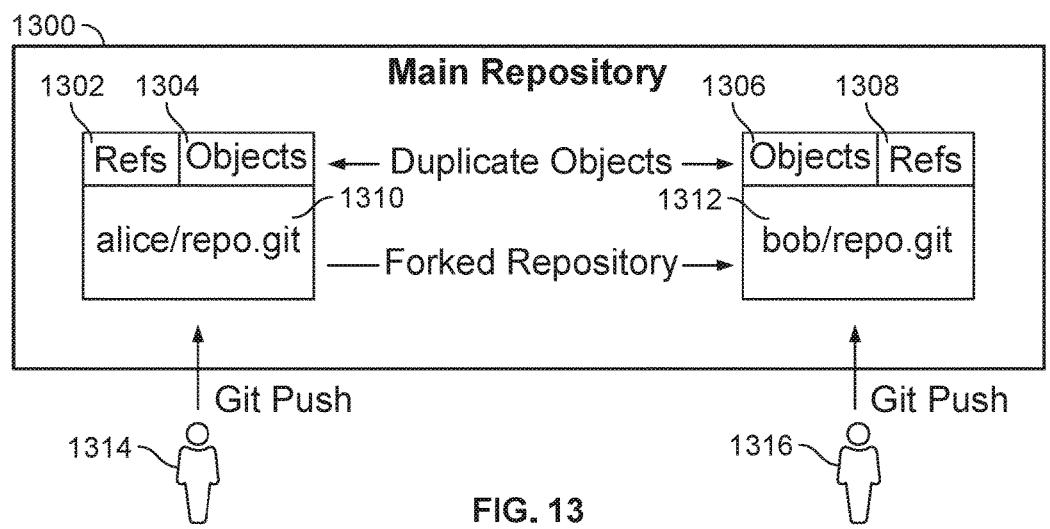
FIG. 13 is a diagram illustrating an embodiment of a standard repository system.

FIG. 13 is a diagram illustrating an embodiment of a standard repository system. An embodiment of main repository 1300 storage functions as follows:
  User 1314 (e.g., Alice) creates a new public repository, alice/repo.git 1310 on main repository 1300 and pushes some data to it.
    The data, refs 1302 (e.g., references to objects indicating a location where objects can be accessed), and objects 1304, are stored in main repository 1300 under a path based on her username and the name of the repository, alice/repo.git 1310
  User 1316 (e.g., Bob) comes along and forks Alice's repository (e.g., creating objects 1306, refs 1308 in bob/repo.git 1312) so that he can make his changes and additions to bob/repo.git 1312.
    A record is made in the database that bob/repo.git 1312 is a fork of alice/repo.git 1310.
    Bob's refs (e.g., refs 1308—for example, references to objects indicating a location where objects can be accessed) and objects (e.g., objects 1306) are stored separately from Alice's copy (e.g., alice/repo.git 1310) as bob/repo.git 1312.
    There will be two complete copies of the refs (e.g., refs 1302 and refs 1308 that are small and often unique to Alicia & Bob) and objects (e.g., objects 1304 and objects 1306 that are large and mostly shared) using a lot of disk space with redundant data.

In some embodiments, main repository 1300 storage functions as follows:

Bob creates a Pull Request of some fixes he's made in bob/repo.git 1312 to alice/repo.git 1310 to suggest that she merge them.

The new refs & objects comprising Bob's changes live solely in bob/repo.git 1312

Alice merges Bob's Pull Request, accepting his changes.

The new objects are duplicated in to objects 1304 of alice/repo.git 1310 and her refs 1302 are updated to include the changes.

Alice clones a new copy of her repository, alice/repo.git 1310 (e.g., pull to get changes, or pushes up new changes)

All operations on alice/repo.git 1310 consider only the data in that repository (e.g., directory)

Figure 14:
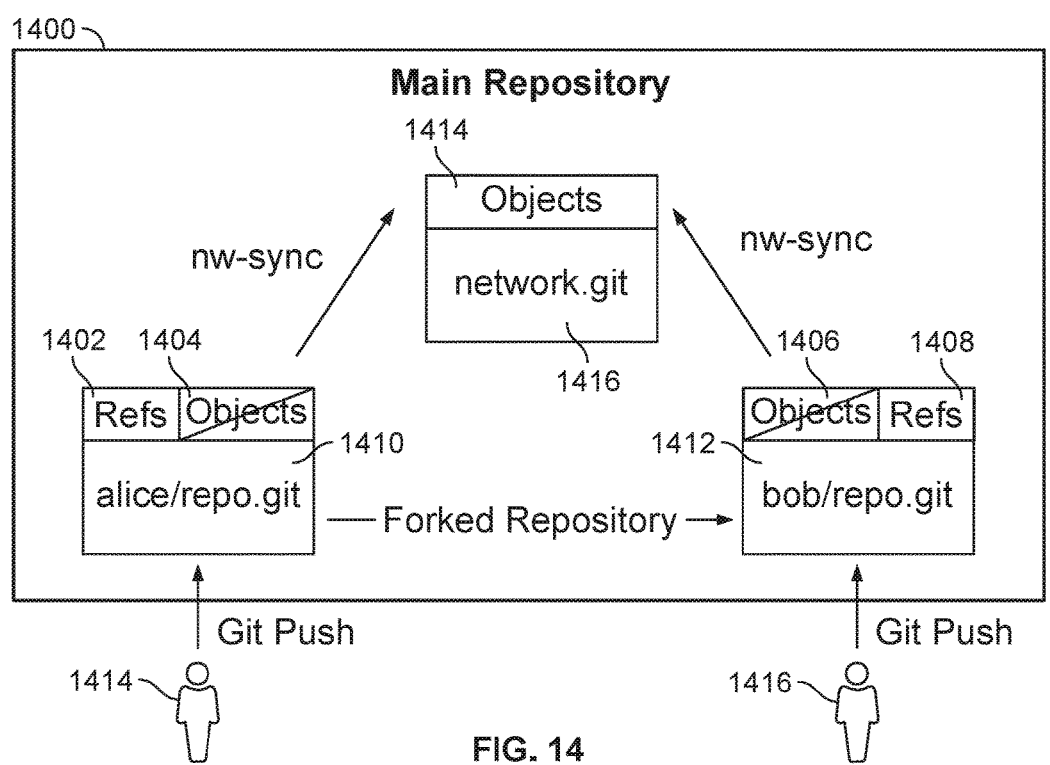
FIG. 14 is a diagram illustrating an embodiment of a standard repository to efficient repository migration.

FIG. 14 is a diagram illustrating an embodiment of a standard repository to efficient repository migration. An embodiment of main repository 1400 storage functions as follows:

User 1414 (e.g., Alice) creates a new public repository, alice/repo.git 1410 on main repository 1400 and pushes some data to it.

The data, refs 1402 (e.g., references to objects indicating a location where objects can be accessed), and objects 1404, are stored in main repository 1400 under a path based on the repository id, e.g. /repositories/42, which is also the network id since it's a newly created repo/network.

A network.git is created in that directory alongside the repository 42.git and a "git alternatives" config is applied that tells git to look in network.git 1414 for any objects that it fails to find in 42.git.

Pushed objects are initially stored in 42.git as they're received by the server (e.g., objects 1404).

A maintenance process is scheduled to process 42.git in order to migrate its objects (e.g., objects 1404) into the network.git 1416 directory (e.g., objects 1414) where they can be shared (in the future).

The maintenance process examines the objects in 42.git objects directory and processes them in sequence.

If the object exists in network.git 1416's objects directory it is deleted from 42.git.

If the object does not exist in network.git 1416's object directory it is copied there and once successfully copied it is deleted from 42.git.

User 1416 (e.g., Bob) comes along and forks Alice's repository (e.g., refs 1402, objects 1404 in alice/repo.git) so that he can make his changes and additions, bob/repo.git 1412

A record is made in the database that bob/repo.git 1412 is a fork of alice/repo.git 1410.

A new repo, 43.git is added to the existing network, alongside Alice's original 42.git.

43.git's "git alternatives" file is configured to check network.git 1416 for objects that don't exist in 43.git.

43.git receives a copy of 42.git's current refs as its initial state.

Bob creates a Pull Request of some fixes he's made in bob/repo.git 1412 to alice/repo.git 1410 to suggest that she merge them.

Objects in 43.git follow the same process of migration to network.git 1414 as 42.git.

Alice merges Bob's Pull Request, accepting his changes.

The merge only involves updating 42.git's refs since the objects are available in network.git 1414 (shared with 43.git).

Alice clones a new copy of her repository, alice/repo.git 1410 (pull to get changes, or pushes up new changes). 42.git's refs are used/provided to Alice.

Objects are first looked for in 42.git's objects directory and if not found there network.git 1414's object directory is checked.

Figure 15:
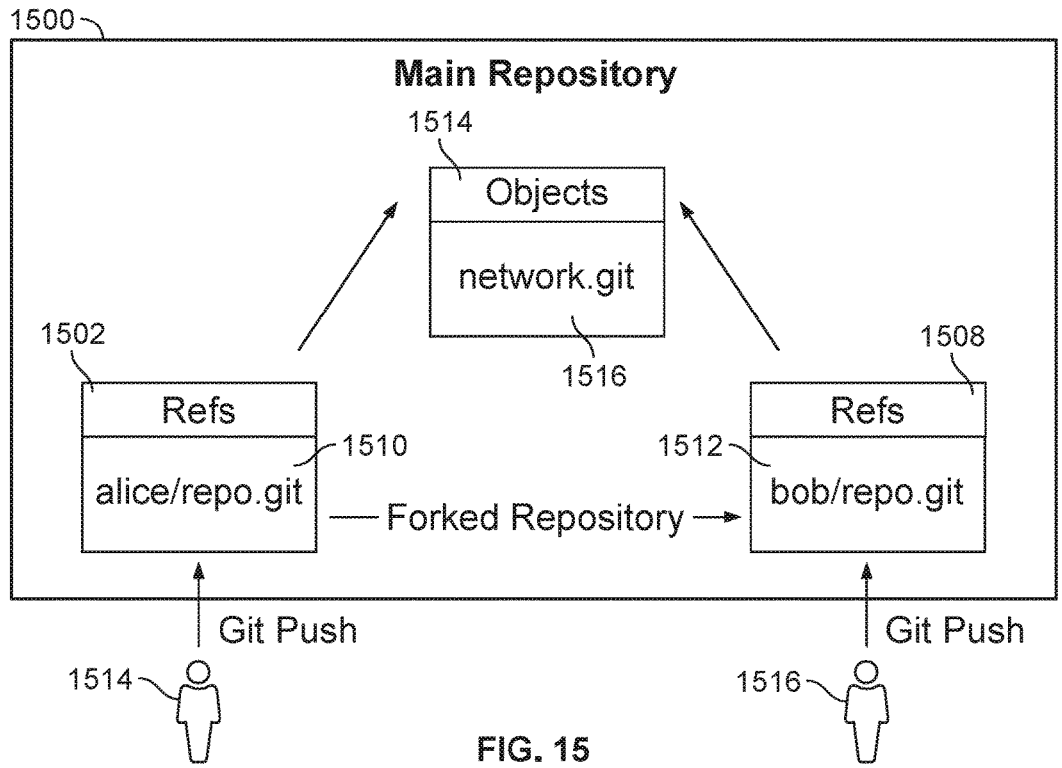
FIG. 15 is a diagram illustrating an embodiment of an efficient repository system.

FIG. 15 is a diagram illustrating an embodiment of an efficient repository system. In the example shown, main repository 1500 includes alice/repo.git 1510, bob/repo.git 1512, network.git 1516. Alice/repo.git 1510 includes refs 1502 which point to objects stored in objects 1514 of network.git 1516. Bob/repo.git 1512 includes refs 1508 which point to objects stored in objects 1514 of network.git 1516. In the event that user 1514 (e.g., Alice) or user 1516 (e.g., Bob) push data to their repositories (e.g., alice/repo.git 1510 and bob/repo.git, respectively), then the data is stored in object 1514 of network 1516 with a reference that points to where the object is stored (e.g., a reference stored in refs 1502 and refs 1508, respectively).

Figure 16:
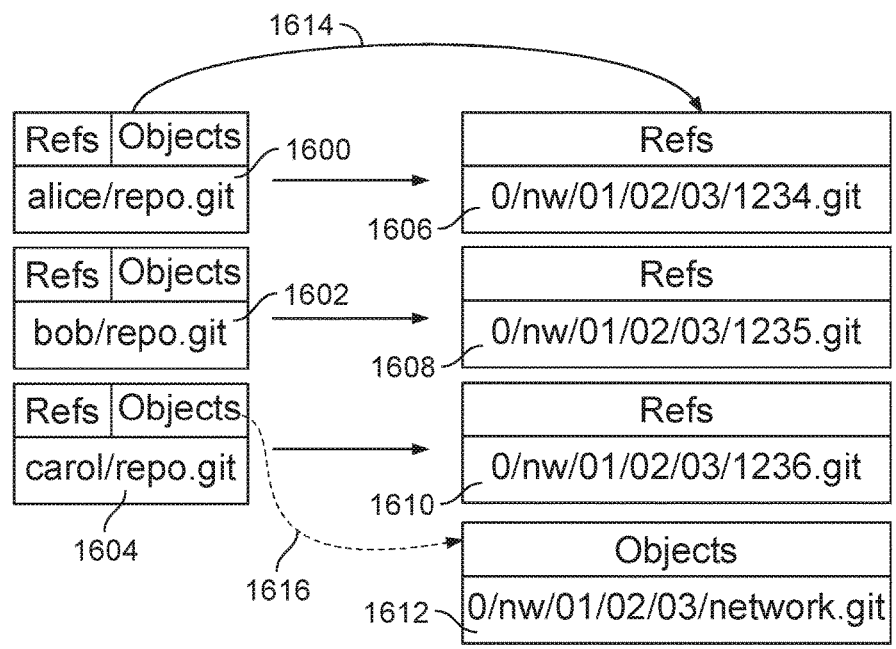
FIG. 16 is a diagram illustrating an embodiment of a standard repository to efficient repository migration.

FIG. 16 is a diagram illustrating an embodiment of a standard repository to efficient repository migration. In the example shown, repository 1600 (e.g., alice/repo.git), repository 1602 (e.g., bob/repo.git), and repository 1604 (e.g., carol/repo.git) are each stored separate repositories that are part of a network (e.g., related forks of a repository). Each is shown storing all refs and objects of the repository prior to migration. Repository 1600 is migrated to repository 1606 (e.g., 0/nw/01/02/03/1234.git). The repository is given a name that enables easy relations with other repositories that are part of the network after migration (e.g., repository 1608, repository 1610). Objects of the network are migrated to the efficient repository system by storing all objects in repository 1612 (e.g., copying 1616 objects from repository 1604 objects to repository 1612) thus eliminating all duplication storage). Repository 1606, repository 1608, and repository 1610 receive migrated copies of each repositories refs (e.g., copying 1614 references from repository 1600 to repository 1606) that point to the objects stored in repository 1612. In some embodiments, the repository name and/or path is generated using a hash of the network contents or any other appropriate manner of naming the repository and/or path.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for repository privatization, comprising:
an interface to:
receive an indication to make private a source repository; and
a processor to:
create a new network directory;
add a new network repository to the new network directory;
transfer data objects to the new network repository from the source repository; and
change a network identifier (ID) of the source repository.

2. The system of claim 1, wherein the processor is further to:
add a new user repository to the new network directory.

3. The system of claim 1, wherein the processor is further to:
add a new user repository to the new network directory; and
transfer a data object, a data object reference, or a combination thereof from the source repository to the new user repository.

4. The system of claim 1, wherein the processor is further to:
copy over remaining files that are part of the source repository to the new network repository.

5. The system of claim 1, wherein the processor is further to:
copy over remaining files that are part of the source repository to the new network repository; and
lock the source repository to user changes.

6. The system of claim 5, wherein the remaining files include files that are not data objects or data object references.

7. A method for repository privatization, comprising:
receiving an indication to make private a source repository;
creating, using a processor, a new network directory;
adding, using the processor, a new network repository to the new network directory;
transferring, using the processor, data objects to the new network repository from the source repository; and
changing, using the processor, a network ID of the source repository.

8. The method of claim 7, further comprising:
adding a new user repository to the new network directory.

9. The method of claim 7, further comprising:
adding a new user repository to the new network directory; and
transferring a data object, a data object reference, or a combination thereof from the source repository to the new user repository.

10. The method of claim 7, further comprising:
copying over remaining files that are part of the source repository to the new network repository.

11. The method of claim 7, further comprising:
copying over remaining files that are part of the source repository to the new network repository; and
locking the source repository to user changes.

12. The method of claim 11, wherein the remaining files include files that are not data objects or data object references.

13. One or more hardware storage device(s) having stored thereon computer-executable instructions that are executable by one or more processor(s) of a computer system to cause the computer system to perform repository privatization by causing the computer system to:
receive an indication to make private a source repository;
create a new network directory;
add a new network repository to the new network directory;
transfer data objects to the new network repository from the source repository; and
change a network ID of the source repository.

14. The one or more hardware storage device(s) of claim 13, wherein execution of the computer-executable instructions further causes the computer system to:
add a new user repository to the new network directory.

15. The one or more hardware storage device(s) of claim 13, wherein execution of the computer-executable instructions further causes the computer system to:
add a new user repository to the new network directory; and
transfer a data object, a data object reference, or a combination thereof from the source repository to the new user repository.

16. The one or more hardware storage device(s) of claim 13, wherein execution of the computer-executable instructions further causes the computer system to:
copy over remaining files that are part of the source repository to the new network repository.

17. The one or more hardware storage device(s) of claim 13, wherein execution of the computer-executable instructions further causes the computer system to:
copy over remaining files that are part of the source repository to the new network repository; and
lock the source repository to user changes.

18. The system of claim 1, wherein the source repository is one of a plurality of repositories that all share the network ID.

19. The system of claim 18, wherein, as a result of the plurality of repositories sharing the network ID, the plurality of repositories are identified as being a part of a common network of repositories.

20. The system of claim 19, wherein changing the network ID of the source repository causes the source repository to be removed from the common network of repositories.

* * * * *